United States Patent
Stojanovski et al.

(10) Patent No.: US 12,022,280 B2
(45) Date of Patent: Jun. 25, 2024

(54) NETWORK SELECTION AND SERVICE CONTINUITY IN NON-PUBLIC NETWORKS

(71) Applicant: Apple Inc., Cupertino, CA (US)

(72) Inventors: Alexandre Stojanovski, Paris (FR); Robert Zaus, Munich (DE); Puneet Jain, Hillsboro, OR (US); Meghashree Dattatri Kedalagudde, Portland, OR (US); Ellen Liao, Portland, OR (US)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 17/309,286

(22) PCT Filed: Nov. 13, 2019

(86) PCT No.: PCT/US2019/061103
§ 371 (c)(1),
(2) Date: May 14, 2021

(87) PCT Pub. No.: WO2020/102292
PCT Pub. Date: May 22, 2020

(65) Prior Publication Data
US 2022/0038898 A1 Feb. 3, 2022

Related U.S. Application Data

(60) Provisional application No. 62/767,384, filed on Nov. 14, 2018.

(51) Int. Cl.
| | | |
|---|---|---|
| H04W 12/06 | (2021.01) | |
| H04W 48/18 | (2009.01) | |
| H04W 60/04 | (2009.01) | |
| H04W 36/14 | (2009.01) | |
| H04W 48/12 | (2009.01) | |
| H04W 84/04 | (2009.01) | |

(52) U.S. Cl.
CPC ........... *H04W 12/06* (2013.01); *H04W 48/18* (2013.01); *H04W 60/04* (2013.01); *H04W 36/14* (2013.01); *H04W 48/12* (2013.01); *H04W 84/042* (2013.01)

(58) Field of Classification Search
CPC ..... H04W 12/06; H04W 36/14; H04W 48/12; H04W 48/18; H04W 60/04; H04W 84/042
See application file for complete search history.

(56) References Cited

U.S. PATENT DOCUMENTS

| | | | |
|---|---|---|---|
| 8,818,359 B2 | 8/2014 | Bai et al. | |
| 2010/0215026 A1* | 8/2010 | Cheng | H04W 36/385 370/338 |
| 2011/0211567 A1 | 9/2011 | Chai et al. | |
| 2013/0231105 A1* | 9/2013 | Bai | H04W 48/18 455/552.1 |
| 2014/0341191 A1* | 11/2014 | Buckley | H04L 63/08 370/331 |
| 2019/0261260 A1* | 8/2019 | Dao | H04W 48/00 |

FOREIGN PATENT DOCUMENTS

| | | |
|---|---|---|
| CN | 101194437 | 6/2008 |
| KR | 10-2015-0134378 | 12/2015 |
| KR | 10-2018-0089340 | 8/2018 |
| WO | 2017/123812 | 7/2017 |

OTHER PUBLICATIONS

Nokia et al., "Terminology correction for type-a/type-b to non-public network", SA WG2 Meeting #129, S2-1810432, Oct. 9, 2018, 33 sheets.

Intel et al., "Update to Solution#3", 3GPP TSG SA WG2 Meeting #129, S2-1810404, Oct. 9, 2018, 6 sheets.

Chencan et al., "WLAN/WPAN network adapter based on TDM technology", Computer Technology and Its Applications, China Academic Journal Electronic Publishing House, 1994-2023, 3 sheets.

* cited by examiner

*Primary Examiner* — D'Arcy Winston Straub
(74) *Attorney, Agent, or Firm* — Fay Kaplun & Marcin, LLP

(57) ABSTRACT

An apparatus of user equipment (UE) comprises one or more baseband processors to process at least one non-public network (NPN) identifier (NPN-ID) broadcast by an NPN and zero or more Public Land Mobile Network (PLMN) identifier (PLMN-ID) broadcast by a PLMN, to compare the NPN-ID against a logical list of NPN-IDs and PLMN-IDs ranked in decreasing order of priority, and to connect with the highest ranked processed NPN or PLMN based on a rank of the NPN-ID in the list. The apparatus can include a memory to store the list of NPN-IDs and PLMN-IDs as a logical list of Equivalent Home Networks or as Operator Controlled Network Selector with Access Technology list.

18 Claims, 4 Drawing Sheets

NETWORK SELECTION AND SERVICE CONTINUITY IN NON-PUBLIC NETWORKS

CROSS-REFERENCE TO RELATED APPLICATIONS

The present application claims the benefit of U.S. Provisional Application No. 62/767,384 (AB7102-Z) filed Nov. 14, 2018. Said Application No. 62/767,384 is hereby incorporated herein by reference in its entirety.

BACKGROUND

As part of Release 16 of the Third Generation Partnership Project (3GPP) standard, support is being worked on for supporting Non-Public Networks. The Stage 1 requirements are defined in Technical Standard (TS) 22.261 clause 6.25.2 as follows. The Fifth Generation (5G) system shall support standalone operation of a non-public network, i.e. a non-public network may be able to operate without dependency on a public land mobile network (PLMN). Subject to an agreement between the operators and service providers, operator policies and the regional or national regulatory requirements, the 5G system shall support for non-public network subscribers: access to subscribed PLMN services via the non-public network; service continuity for subscribed PLMN services between a non-public network and a PLMN; access to selected non-public network services via a PLMN; and service continuity for non-public network services between a non-public network and a PLMN.

A non-public network subscriber to access a PLMN service shall have a service subscription using 3GPP identifiers and credentials provided or accepted by a PLMN. The 5G system shall support a mechanism for a user equipment (UE) to identify and select a non-public network. The 5G system shall support identifiers for a large number of non-public networks to minimize collision likelihood between assigned identifiers. The Stage 2 study directed to architecture study is documented in Technical Report (TR) 23.734.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
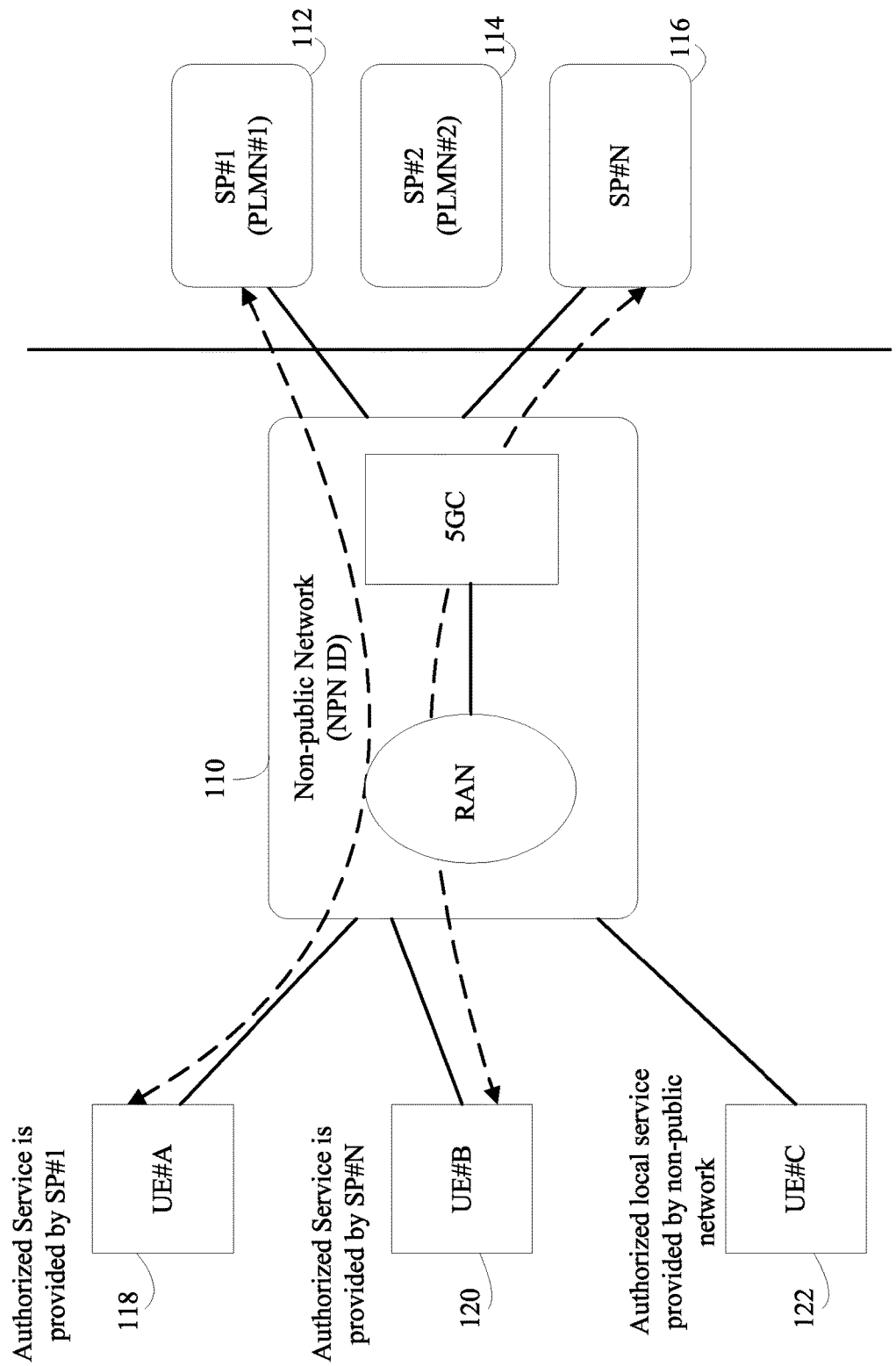
FIG. 1 is a diagram of an example of a non-public network to connect UE #A, UE #B, and UE #C in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an example of a non-public network to connect UE #A, UE #B, and UE #C in accordance with one or more embodiments will be discussed. FIG. 1 corresponds to Figure 6.3.1.1-1 in Technical Report (TR) 23.734 and shows a Non-Public Network (NPN) 110 allowing a user equipment (UE) to obtain services from a set of Service Providers (SPs). Some of the Service Providers can be public land mobile networks (PLMNs), for example SP #1 112 or SP #2 114, or some other type of service providers, for example SP #N 116. The NPN 110 is identified with an NPN identifier (NPN-ID), whereas each of the SPs can be identified with a Service Provider identifier (SP-ID).

As shown in FIG. 1, UE #A 118, UE #B 120, and UE #C 122 are registered to the Non-Public Network 110 identified by a Non-public network ID (NPN ID). The service provider represented by SP #1 112, which is a PLMN, provides the authorized service for UE #A 118. The service provider represented by SP #N 116, which is a third party service provider, provides the authorized service for UE #B 120. UE #C 122 is connected to the standalone NPN 110 identified by NPN ID. In some examples, the standalone NPN 110 can be deployed in a factory enterprise.

In some examples as discussed herein the following can be assumed. The UE can be configured with the following information: at least one SP-IDs for the SP that owns UE's subscription; authentication parameters including credential, and authentication method of the configured SP-ID; an NPN ID or list of NPN IDs for the NPNs that can provide the UE with access to this SP. The following can be further assumed. The radio access network (RAN) broadcasts both its own NPN-ID and optionally the SP-IDs of the SPs to which it can provide access; and to perform network selection the UE listens to available NPN-IDs in the geographical location, and makes a first-level selection retaining only NPN-IDs providing access to the desired SP-ID that are also on the UE's configured NPN-ID list, and makes a second-level selection whereby it selects one of the NPN-IDs from the retained subset based on unspecified criteria.

Once the network selection is complete, the UE registers with the network by providing the UE identity and credential corresponding to the SP-ID. While not shown in FIG. 1, it is assumed that the authentication request is routed to a subscriber database residing in the SP's administrative domain. When the SP is a PLMN, the subscriber database can correspond to a home subscriber server (HSS) or a unified data management (UDM) server, for example UDM 212 of FIG. 2, below.

In accordance with one or more embodiments, the UE can be configured with an "Equivalent Home Network" list which is analogous to the Equivalent Home PLMN (EHPLMN) list in 3GPP. The Equivalent Home Network list can include both NPN-IDs and PLMN-IDs that are ranked in priority order. Each NPN-ID can be associated with one or more SP-IDs of SPs to which this NPN can provide access. Alternatively, the UE can be configured with an "Operator Controlled Network Selector with Access Technology" list which is analogous to the "Operator Controlled PLMN Selector with Access technology" list in 3GPP. The Operator Controlled Network Selector with Access Technology list can include both NPN-IDs and PLMN-ID/access technology combinations that are ranked in priority order. A PLMN-ID/access technology combination can include one or more access technologies associated with a PLMN. Examples for access technologies are global system for mobile communications evolution radio access network (GERAN) technology, universal mobile telecommunication system terrestrial radio access network (UTRAN), evolved universal mobile telecommunication system terrestrial radio access network (E-UTRAN) technology and next generation radio access network (NG-RAN) technology. Each NPN-ID can be associated with one or more SP-IDs of SPs to which this NPN can provide access. The SP-ID can be advertised on the radio in the System Information Block (SIB), but this is not a pre-requisite for network selection. To enable access to PLMN services the NPN selects a user plane node, for example the packet gateway (PGW) in an evolved packet system (EPS) or the protocol data unit (PDU) session anchor (PSA) in a 5G system (5GS), that provides access to the PLMN services.

To enable service continuity when the UE moves between from NPN coverage into PLMN coverage, and vice-versa, the UE uses the PDU Session transfer with "existing PDU Session" flag, or PDN Connection transfer with "handover" flag, to enable the target system to retrieve the session context via the subscriber's database. In some examples, advertisement of one or more SP-IDs in the SIB is not required. In addition, service continuity for PLMN services can be achieved when the UE moves between a non-public network and a PLMN.

In accordance with one or more embodiments, network selection can be based on the following assumptions. The UE has a subscription with SP #X; the SP #X has an agreement with NPN #A, allowing UEs that have subscription with SP #X to access the services of SP #X via NPN #A; the UE has a stored "Equivalent Home Network" list that contains both SP #X and NPN #A; the radio access network (RAN) of NPN #A broadcasts its own identifier (NPN #A). Additionally, it may broadcast the ids of supported SPs to which it provides access (e.g. SP #X), but it does not have to; and when performing network selection, the UE, which is looking to connect to SP #X, will select NPN #A because it is configured as an "Equivalent Home Network".

In case UE is in the coverage of multiple NPNs each of which provide access to SP #X, the UE selects the NPN-ID that ranks highest in the "Equivalent Home Network" list. Networks in the "Equivalent Home Network" list are listed in decreasing order of priority. As an alternative, the UE can have a stored "Operator Controlled Network Selector with Access Technology" list and selects the NPN-ID that ranks highest in this list. Networks in this list have a lower priority and/or rank than the networks stored in the "Equivalent Home Network" list. This alternative can be used especially if there is not any PLMN broadcasting the PLMN ID of the UE's service provider SP #X, or if SP #X wants the UE to prefer the use of the PLMN of SP #X over the use of NPN #A.). In one or more embodiments, the "Equivalent Home Network" list can be analogous to the "Equivalent HPLMN" list defined in 3GPP TS 23.122, whereas the "Operator Controlled Network Selector with Access Technology" can be analogous to the "Operator Controlled PLMN Selector with Access Technology" list, also defined in 3GPP TS 23.122.

In both cases, the new lists can contain both public network identifiers (i.e., PLMN IDs) and private network identifiers (i.e. NPN-ID). The SP-ID is also part of the lists and can have either format (i.e., format of a PLMN ID or of an NPN-ID).

For backwards compatibility reasons, there can be two alternative solutions that can achieve the effect of mixing private and public network identifiers in the same list, without having to change the existing lists (i.e., "Equivalent HPLMN" list and "Operator Controlled PLMN Selector with Access Technology" list) containing only public identifiers.

In a first embodiment, a separate ordered list can be created for the NPN-IDs. For each NPN, an entry can be created in the existing Equivalent HPLMN (EHPLMN) list which consists of a 'dummy' mobile country code (MCC) (e.g., 999) and a 3 digit mobile network code (MNC) where the MNC=number (or index) is pointing to the related NPN-ID in the NPN-ID list. For example:

$$NPN\text{-}ID \text{ list} = \{NPN\text{-}ID\ 1, NPN\text{-}ID\ 2, \ldots, NPN\text{-}ID\ k\}$$

$$EHPLMN \text{ list} =$$

$$\{PLMN\ 1, \text{``}999+002\text{''}, PLMN\ 2, \text{``}999+001\text{''}, PLMN\ 3, \ldots, PLMN\ x\}$$

$$\text{'merged' list} = \{PLMN\ 1, NPN\text{-}ID\ 2, PLMN\ 2, NPN\text{-}ID\ 1,$$

$$PLMN\ 3, \ldots, PLMN\ x\} = \text{``Equivalent Home Network'' list}$$

In a second embodiment, a list of (NPN-ID, index) pairs can be created. For each NPN-ID the index gives the position of the PLMN-ID in the EHPLMN list after which the NPN-ID is to be inserted. Index=0 refers to the very first position of the merged list, before any of the EHPLMNs. For example:

$$NPN\text{-}ID \text{ list} = \{(NPN\text{-}ID\ 1, 2), (NPN\text{-}ID\ 2, 1), \ldots, (NPN\text{-}ID\ k, y)\}$$

$$EHPLMN \text{ list} = \{PLMN\ 1, PLMN\ 2, PLMN\ 3, \ldots, PLMN\ x\}$$

'merged' list =

-continued

{*PLMN* 1, *NPN-ID* 2, *PLMN* 2, *NPN-ID* 1, *PLMN* 3, ... , *PLMN x*} =

"Equivalent Home Network" list

Both embodiments, above, are backwards compatible in the sense that a new USIM including the NPN-ID list can be inserted in a legacy UE without creating any issues for the legacy PLMN selection. The UE will perform PLMN selection based on the EHPLMN list and "Operator Controlled PLMN Selector with Access Technology" list and ignore any NPN-ID list stored on the universal subscriber identity module (USIM).

Figure 2:
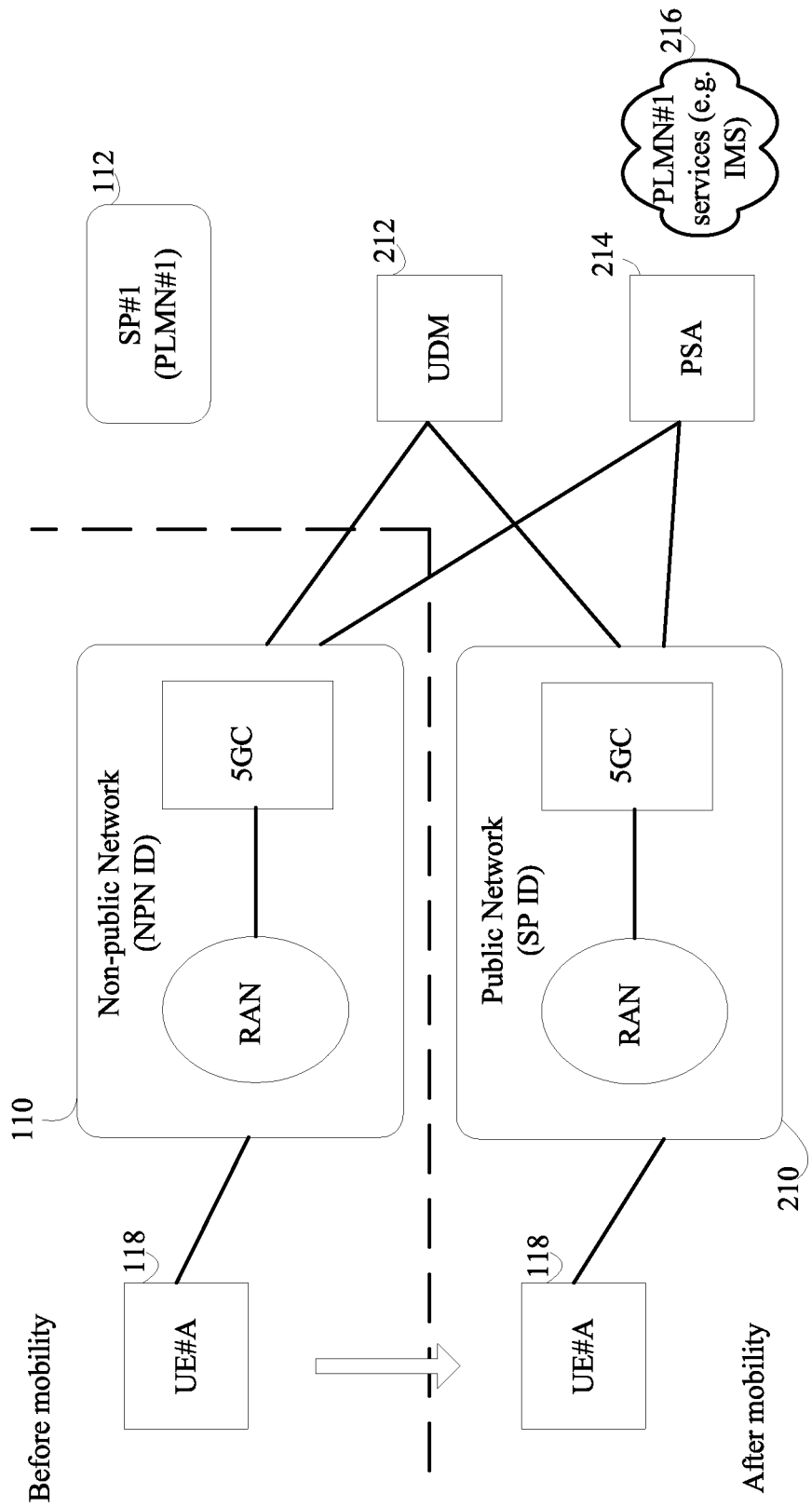
FIG. 2 is a diagram of service continuity for PLMN services in accordance with one or more embodiments.

Referring now to FIG. 2, a diagram of service continuity for public land mobile network (PLMN) services in accordance with one or more embodiments will be discussed. In some examples, service continuity can be based on the following assumptions. The UE has a subscription with SP #X. The SP #X has an agreement with NPN #A allowing UEs that have subscription with SP #X to access the services of SP #X via NPN #A. In this case SP #X is a public network (a PLMN). For example, in FIG. 2, SP #1 112 is PLMN #1. When establishing a PDU Session that requires service continuity, NPN #A selects a PDU Session Anchor (PSA) 214 for a 5G system (5GS) or a PDN Gateway for an evolved packet system (EPS) that provides access to SP #X services as shown in FIG. 2.

When UE #A 118 leaves the coverage of NPN #A 110, UE #A can reselect to another NPN providing access to SP #1, if available, or UE #A 118 can reselect to the radio access network of the PLMN 210 of SP #1 112. After UE #A 118 completes registration with the mobile network of SP #1 112, the UE #A 118 performs PDU Session, or PDN connection, transfer by setting the "Existing PDU Session" flag, or "handover" flag, in the PDU Session establishment, or PDN connection establishment, request. Such an arrangement allows the mobile network of SP #1 112 to retrieve the session context and thus preserve session continuity. UE #A 118 can then continue to receive PLMN #1 services 216, for example an Internet Protocol (IP) multimedia subsystem (IMS) call.

Figure 3:
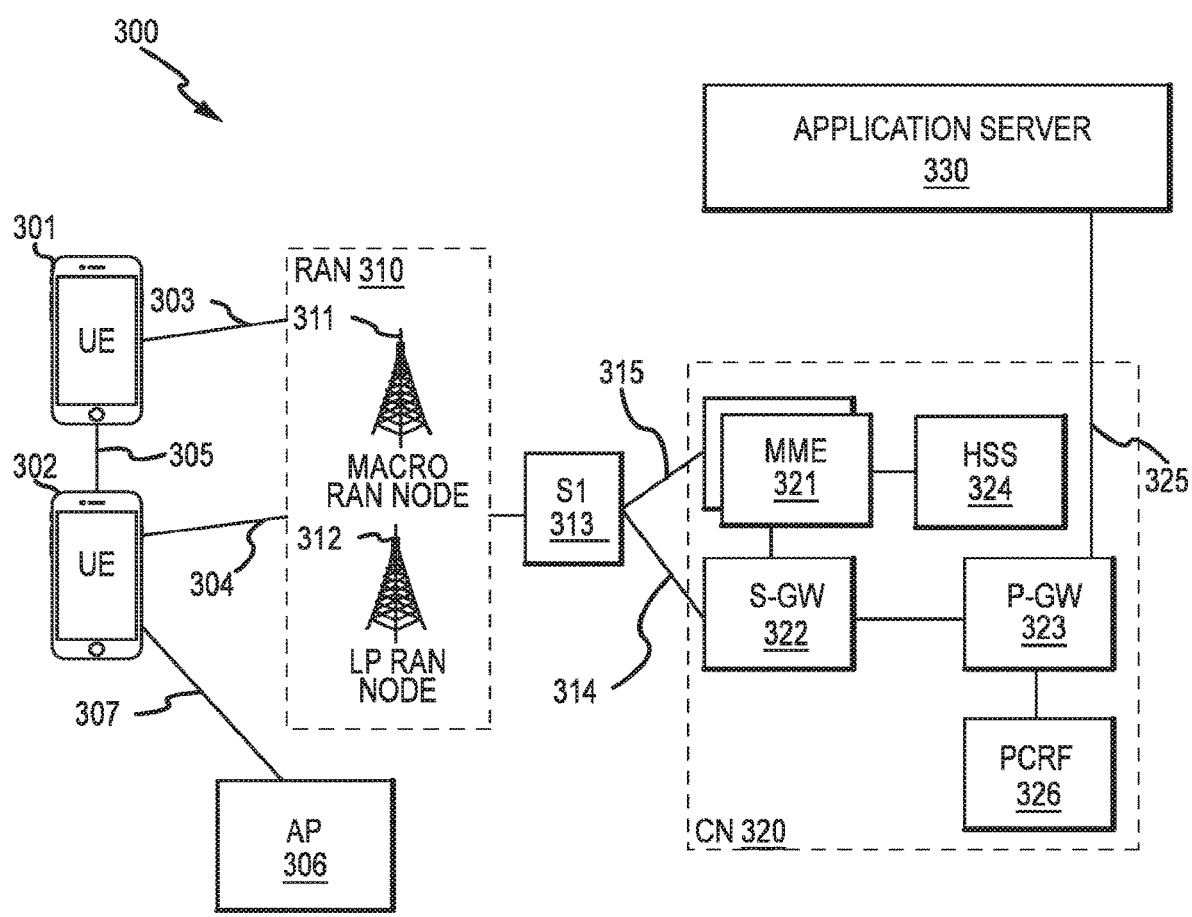
FIG. 3 illustrates an architecture of a system of a network in accordance with some embodiments.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310—the RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 is shown to be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and the serving gateway (S-GW) 322, and the S1-mobility management entity (MME) interface 315, which is a signaling interface between the RAN nodes 311 and 312 and MMEs 321.

In this embodiment, the CN 320 comprises the MMEs 321, the S-GW 322, the Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the EPC network 323 and external networks such as a network including the application server 330 (alternatively referred to as application function (AF)) via an Internet Protocol (IP) interface 325. Generally, the application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
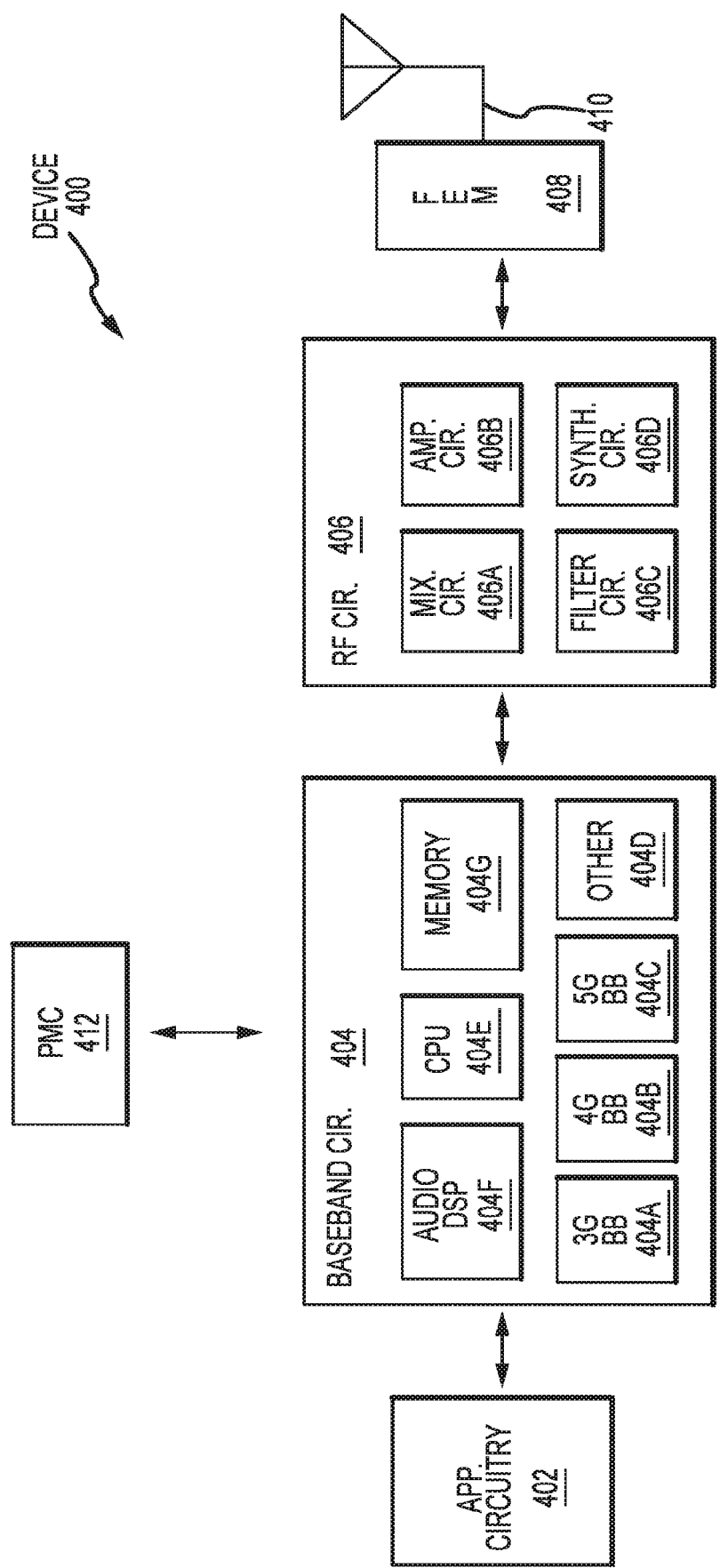
FIG. 4 illustrates example components of a device in accordance with some embodiments.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include less elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals, and the input baseband signals may be analog baseband signals, although the scope of the embodiments is not limited in this respect. In some alternate embodiments, the output baseband signals, and the input baseband signals, may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect. In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage-controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM 408, or in both the RF circuitry 406 and the FEM 408.

In some embodiments, the FEM circuitry 408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device is included in a UE. The PMC 412 may increase the power conversion efficiency while providing desirable implementation size and heat dissipation characteristics.

While FIG. 4 shows the PMC 412 coupled only with the baseband circuitry 404. In other embodiments, however, the PMC 412 may be additionally or alternatively coupled with, and perform similar power management operations for, other components such as, but not limited to, application circuitry 402, RF circuitry 406, or FEM 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX)

after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used execute Layer 3, Layer 2, or Layer 1 functionality, while processors of the application circuitry 404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

The following are example implementations of the subject matter described herein. In a first example, an apparatus of user equipment (UE) comprises one or more baseband processors to process at least one non-public network (NPN) identifier (NPN-ID) broadcast by an NPN and zero or more Public Land Mobile Network (PLMN) identifier (PLMN-ID) broadcast by a PLMN, to compare the at least one NPN-IDs and the zero or more PLMN-IDs against a logical list of NPN-IDs and PLMN-IDs ranked in decreasing order of priority, and to connect with the highest ranked processed NPN or PLMN based on a rank of the NPN-ID or PLMN-ID in the list, and a memory to store the logical list of NPN-IDs and PLMN IDs. In a second example, one or more machine readable media have instructions thereon that, when executed by an apparatus of user equipment (UE), result in processing at least one non-public network (NPN) identifier (NPN-ID) broadcast by an NPN and zero or more Public Land Mobile Network (PLMN) identifier (PLMN-ID) broadcast by a PLMN, comparing the at least one NPN-ID and the zero or more PLMN-IDs against a logical list of NPN-IDs and PLMN-IDs ranked in decreasing order of priority, and connecting with the highest ranked processed NPN or PLMN based on a rank of the NPN-ID or PLMN-ID in the list.

Although the claimed subject matter has been described with a certain degree of particularity, it should be recognized that elements thereof may be altered by persons skilled in the art without departing from the spirit and/or scope of claimed subject matter. It is believed that the subject matter pertaining to network selection and service continuity in non-public networks and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
radio frequency circuitry configured to communicate with a non-public network (NPN); and
one or more baseband processors communicatively coupled to the radio frequency circuitry and configured to perform operations comprising:
processing at least one NPN identifier (NPN-ID) broadcast by an NPN and zero or more Public Land Mobile Network (PLMN) identifier (PLMN-ID) broadcast by a PLMN;
comparing the at least one NPN-IDs and the zero or more PLMN-IDs against a logical list of NPN-IDs and PLMN-IDs ranked in decreasing order of priority, wherein the logical list is a list of Equivalent Home Networks that includes one or more PLMN identifiers (PLMN-IDs) and one or more NPN-IDs, wherein the logical list of Equivalent Home Networks is a combination of an Equivalent Home PLMN list and an NPN-ID list whereby the one or more NPN-IDs are disguised as a PLMN-ID in the Equivalent Home PLMN list using a dummy mobile country code (MCC) and a pointer mobile network code (MNC) that points to a corresponding NPN-ID in the NPN-ID list; and
connecting with a highest ranked processed NPN or PLMN based on a rank of the NPN-ID or PLMN-ID in the list.

2. The apparatus of claim 1, wherein the logical list further includes an Operator Controlled Network Selector with Access Technology list that includes one or more PLMN identifiers (PLMN-IDs) and one or more NPN-IDs.

3. The apparatus of claim 2, wherein the logical list of Operator Controlled Network Selector with Access Technology is a combination of an Operator Controlled PLMN Selector with Access Technology list and an NPN-ID list whereby the one or more NPN-IDs are disguised as a PLMN-ID using a dummy mobile country code (MCC) and a pointer mobile network code (MNC) that points to a corresponding NPN-ID in the NPN-ID list.

4. The apparatus of claim 3, wherein the Operator Controlled PLMN Selector with Access Technology list and the NPN-ID list are stored as separate lists and whereby at least the Operator Controlled PLMN Selector with Access Technology list is stored on a Universal Subscriber Identity Module (USIM).

5. The apparatus of claim 2, wherein the logical list of Operator Controlled Network Selector with Access Technology is a combination of an Operator Controlled PLMN Selector with Access Technology list and an NPN-ID list whereby the NPN-ID list includes a list of NPN-ID and pointer pairs, wherein the pointer indicates a location in the Operator Controlled PLMN Selector with Access Technology list where the NPN-ID is inserted.

6. The apparatus of claim 1, wherein the logical list of Equivalent Home Networks is a combination of an Equivalent Home PLMN list and an NPN-ID list whereby the NPN-ID list includes a list of NPN-ID and pointer pairs, wherein the pointer indicates a location in the Equivalent Home PLMN list where the NPN-ID is inserted.

7. The apparatus of claim 1, wherein the Equivalent Home PLMN list and the NPN-ID list are stored as separate lists and whereby at least the Equivalent Home PLMN list is stored on a Universal Subscriber Identity Module (USIM).

8. The apparatus of claim 1, wherein the logical list of NPN-IDs and PLMN-IDs includes, for each NPN-ID, at least one ID of a Service Provider (SP) owning subscription or authentication credentials for the UE.

9. The apparatus of claim 8, wherein the one or more baseband processors are further to register with the NPN and to authenticate with the SP.

10. The apparatus of claim 8, wherein the SP comprises a 5G network having a protocol data unit (PDU) Session Anchor (PSA).

11. The apparatus of claim 8, wherein the one or more baseband processors further are to reselect to a PLMN that is operated by or internetworks with the SP.

12. The apparatus of claim 11, wherein the one or more baseband processors further are to perform protocol data unit (PDU) Session transfer from the NPN to the PLMN of a previously established PDU Session by setting an "Existing PDU Session" flag in a PDU Session Request to allow a target network to retrieve a session context of the previously established PDU Session.

13. The apparatus of claim 12, wherein the one or more baseband processors are to reselect back to the non-public network (NPN).

14. The apparatus of claim 13, wherein the one or more baseband processors are to perform PDU Session transfer from the PLMN to the NPN of the previously established PDU Session by setting the "Existing PDU Session" flag in PDU Session Request, which allows the target network to retrieve the session context of the previously established PDU Session.

15. The apparatus of claim 1, wherein information broadcast by the NPN includes at least one ID of a Service Provider (SP) to which the NPN provides access.

16. A processor of a user equipment (UE) configured to perform operations comprising:
processing at least one non-public network (NPN) identifier (NPN-ID) broadcast by an NPN and zero or more Public Land Mobile Network (PLMN) identifier (PLMN-ID) broadcast by a PLMN;
comparing the at least one NPN-ID and the zero or more PLMN-IDs against a logical list of NPN-IDs and PLMN-IDs ranked in decreasing order of priority, wherein the logical list of NPN-IDs and PLMN-IDs includes, for each NPN-ID, at least one ID of a Service Provider (SP) owning subscription or authentication credentials for the UE;
connecting with a highest ranked processed NPN or PLMN based on a rank of the NPN-ID or PLMN-ID in the list;
reselect to a PLMN that is operated by or internetworks with the SP; and
perform protocol data unit (PDU) Session transfer from the NPN to the PLMN of a previously established PDU Session by setting an "Existing PDU Session" flag in a PDU Session Request to allow a target network to retrieve a session context of the previously established PDU Session.

17. The processor of claim 16, wherein the logical list is a list of Equivalent Home Networks that includes one or more PLMN identifiers (PLMN-IDs) and one or more NPN-IDs.

18. The processor of claim 16, wherein the logical list is an Operator Controlled Network Selector with Access Technology list that includes one or more PLMN identifiers (PLMN-IDs) and one or more NPN-IDs.

* * * * *